United States Patent [19]

Anderson

[11] 4,033,925

[45] July 5, 1977

[54] MONOMERIC FURFURYL ALCOHOL-RESORCINOL FOUNDRY BINDERS

[75] Inventor: Hugh C. Anderson, Palatine, Ill.

[73] Assignee: The Quaker Oats Company, Chicago, Ill.

[22] Filed: July 12, 1976

[21] Appl. No.: 704,329

[52] U.S. Cl. .................................. 260/42.53; 164/43; 260/33.4 P; 260/47 UA; 260/DIG. 40
[51] Int. Cl.² ........................................... C08K 3/36
[58] Field of Search ........ 260/334 P, 42.53, 470 A, 260/DIG. 40; 164/43

[56] References Cited

UNITED STATES PATENTS

| | | | |
|---|---|---|---|
| 1,987,228 | 1/1935 | Brunson | 260/33.4 P X |
| 2,831,898 | 4/1958 | Ecke et al. | 260/47 UA X |
| 3,008,205 | 11/1961 | Blaies | 260/42.53 X |
| 3,487,043 | 12/1969 | Grudus | 260/42.53 |
| 3,639,654 | 2/1972 | Robins | 260/DIG. 40 |

*Primary Examiner*—Sandra M. Person
*Attorney, Agent, or Firm*—Joseph P. O'Halloran

[57] ABSTRACT

A monomeric foundry binder comprising furfuryl alcohol and resorcinol is disclosed. The binder is substantially anhydrous, generates no nitrogen, is free of formaldehyde odor both in fabrication of the binder and in production of the sand shapes, and in pouring operations. It provides strengths which are better than those normally achieved with polymeric furfuryl alcohol-containing resins, and provides for quicker strip times.

10 Claims, No Drawings

MONOMERIC FURFURYL ALCOHOL-RESORCINOL FOUNDRY BINDERS

BACKGROUND OF THE INVENTION

This invention relates to the foundry art, and, in particular to a sand binder system utilizing furfuryl alcohol monomer.

Generally speaking, the so-called furane foundry binders have been produced from partially resinified mixtures involving furfuryl alcohol, and sometimes including furfural, urea, formaldehyde, phenol and the like.

For the purposes of providing background of the present invention, the furane binders can be regarded as being categorized in one of three classes; namely, the cooked type, (monomeric), polymeric, and the phenol-containing type. The first type of furane binders generally involves mixing monomeric furfuryl alcohol, urea, and formaldehyde, with adjustment of pH to 4.5 or higher, and cooking the resulting mixture for two hours, for example, at an elevated temperature such as 100° C. Under these conditions the furfuryl alcohol polymerization is minimal but the conditions do provide for incorporation of the furfuryl alcohol monomer by condensation into a resin with the urea and formaldehyde.

The so-called polymeric type binder involves the admixture of furfuryl alcohol monomer with urea and/or urea formaldehyde with the adjustment of pH to well below 4.5, e.g., 2.0, and cooking to a desired viscosity for example at 100° C. Ordinarily the water of condensation is stripped off under reduced pressure and the resulting polymer is quite viscous. The resulting polymer is then typically diluted with furfuryl alcohol monomer or in some cases with furfural to get a desired viscosity.

The third type of furane binder involves pre-condensation with phenol, and, typically, the phenol is first polymerized with formaldehyde, for example, under alkaline condition, and the resulting phenol aldehyde is reacted or admixed with furfuryl alcohol polymer typically furfuryl alcohol formaldehyde or furfuryl alcohol urea formaldehyde polymer prior to admixture with sand, for example.

Illustrative of the furfuryl alcohol-phenol resin art are U.S. Pat. Nos. 2,470,440 to Joseph N. Kuzmick, 3,299,167 to Paul E. Knowlson, et al., 3,716,512 to Silvio Vargui, et al., 3,793,286 to Kenneth C. Petersen, et al., 3,847,860 to Claus-Dieter Seiler et al., Netherlands Patent Application No. 66-08856 by Archer Daniels Midland Company, and British Patent Specification No. 1,012,067 to Dow Chemical Company.

Of particular interest is U.S. Pat. No. 2,848,430 to R. N. Frey, et al., which relates to tall oil-phenol furan resin compositions. Whereas the other patents involve the pre-condensation of phenol with various materials, the Frey patent contemplates the use of a monomeric phenol with furfuryl alcohol-tall oil as a phenol-furan resin. Although most of the phenolic compounds discussed by Frey were monohydric, Frey does refer to the use of dihydroxybenzene such as resorcinol. It is noted that FIG. 2 of Frey shows a mixture of tall oil, phenol, and furfuryl alcohol in a number of compositions illustrated in the three sided graph, and a series of compositions drawn along the bottom line of the graph illustrates a range of mixtures of phenol and furfuryl alcohol having between 35 and 60 percent phenol.

At column 2, line 26 Frey makes the statement that from the variety of substituted phenols that were tried, the addition of tall oil to the basic phenol-furan system in no way materially affected the chemical reaction. On the other hand, in Example 7, Frey illustrates the efficacy of both catechol and resorcinol, and it is unequivocally stated "that only the catechol produced the thermosetting resin when combined in a 1:1:1 ratio, by weight with furfural and tall oil. The resorcinol did not react in the 1:1:1 ratio to produce the thermosetting resin with either the furfural or the furfuryl alcohol. Catechol, on the other hand, did produce the resin with furfural, but not with the furfuryl alcohol".

Contrary to the express teachings of Frey, however, we have discovered that a monomeric mixture of resorcinol and furfuryl alcohol is extremely useful as an acid catalyzable liquid binder for the purpose of producing foundry sand shapes.

SUMMARY OF THE INVENTION

The present invention provides a method of manufacturing sand shapes for use as cores and molds, said method comprising:
placing an acid hardenable sand mix in a shaping element, and hardening the mix in the shaping element, the sand mix comprising sand, an acid catalyst, and a minor amount of a monomeric mixture of furfuryl alcohol and resorcinol.

Generally speaking, the resorcinol can be present in the furfuryl alcohol-resorcinol mixture in an amount ranging from about 2 to about 45 percent or to saturated solution conditions. More preferably the resorcinol is present in the range from 2 to 20 percent, and compositions wherein resorcinol is present in the range from about 4 to about 10 percent are most preferred.

Also, generally speaking, any strong acid catalyst of the type which is well known for polymerizing furfuryl alcohol polymers, generally speaking, are useful in accordance with the present invention. However, strong acids and particularly the aromatic sulfonic acids are most preferred for use as catalysts in accordance with the present invention. The amount of binder which is used in the acid hardenable mix is any amount which would normally be used in a bound sand mix for foundry purposes; and, for example sand mixes which have incorporated therein the binder of the present invention in an amount from 0.5 to about 3.0 percent are, generally speaking, eminently satisfactory in accordance with the present invention. However, mixes in which the binder is present from about 1 to 2 percent, inclusive, are more preferred. Also, because of the very high strengths which are achieved in accordance with the present invention, the amount of binder which need be used is lower, generally speaking, than the amounts which are needed when using heretofor conventional binders.

Also, because of the high reactivity of the binder of the present invention, lower levels of acid catalyst can be utilized to provide similar strip and cure times. Consequently, some economy is afforded in the utilization of the binder of the present invention because of the lower acid catalyst requirements.

The binder of the present invention can also include useful adjuncts, as desired. For example, the use of monohydric phenol such as, for example, addition of paracresol to the binder of the present invention is useful although not preferred.

In addition, the binder can include furfuryl alcohol polymeric ingredients such as for example, pre-polymerized furfuryl alcohol, although, generally speaking, it is preferred that the ingredients which are added to the binder of the present invention include no water, urea or formaldehyde.

In the following examples all temperatures are expressed in degrees centigrade, and all weights are expressed in parts by weight, and all percents (%) are expressed as percents by weight based on the weight of the material now being referred to.

EXAMPLE 1

Furfuryl alcohol (95 parts), resorcinol (5 parts) and a commercially available substituted silane identified as A-1100 (a triethoxy-aminopropyl silane) (0.15 parts) are admixed until a homogeneous solution is achieved. The resulting mixture constitutes a binder for use in accordance with the present invention.

EXAMPLE 2

The purpose of the present example is to illustrate the use of a binder in accordance with the present invention in the preparation of a hardened sand mix, with and without the addition of silane. Two batches of foundry sand mix were prepared as follows: Foundry sand (3000 parts), toluenesulfonic acid (55 percent solution in water, 9.0 parts) were admixed by mulling to achieve a uniform distribution of the acid on the admixture. A portion of the liquid resin binder in accordance with the present invention, and produced in accordance with Example 1, is then separated into two respective 45 parts by weight aliquots and to one of the aliquots, 4 drops of Ureidosilane having the following formula (50 percent in methanol) is added:

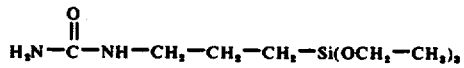

Each respective aliquot of resin binder is added to a respective sand mix and the respective admixtures are mulled separately. As soon as the resin is uniformly distributed on the acid catalyzed sand mix the respective catalyzed resin coated mixes are subjected to bench life determination while, simultaneously, tensile test specimen bisquits (1" cross section) are prepared. The bench life is determined by the use of a Dietert sand rammer. The bench life is arbitrarily determined as the time at which the number of rams required to reach the preset volume is double the number of rams initially required to reach that volume.

The tensile tests are run after overnight storage at the stated relative humidity (either 36 percent or 79 percent) as set forth in the Table. The tensile strength numbers set forth in Table I represent an average of six determinations, in each instance.

TABLE I

|  | Bench Life (Mins.) | 36% R.H. Cure Tensile (psi) | 79% R.H. Cure Tensile (psi) |
| --- | --- | --- | --- |
| Without Silane | 10 | 141 | 40 |
| With Silane | 13 | 464 | 360 |

EXAMPLE 3

The following Example will show a comparison between the use of the present invention which utilizes furfuryl alcohol and resorcinol binder, and the use of some other binders such as for example, a furfuryl alcohol binder and furfuryl alcohol phenol binder. The amount of binder used in each of the tests is 1.5 percent based on the weight of sand. In all, 12 tests were run using the amount of catalyst as set forth in Table II. In all 12 tests the silane used in Example 2 was employed in an amount sufficient to provide 0.15 percent based on the weight of the binder. The procedure used in mixing each of the respective test examples was the same as that used in Example 1. The numbers listed under the column head "Life" were determined by the procedure described in Example 2. The numbers under the column headed "Tensile Strength" were determined by the procedure described in Example 2. The first column of tensile strengths in Table II was run on tensile specimens which had been stored overnight at 26 percent relative humidity and the second column was run on tensile specimens which had been stored overnight at 74 percent relative humidity.

TABLE II

| Test No. | Binder (1.5%) | % Catalyst | (Mins.) Life | (psi) Tensile Strength | |
| --- | --- | --- | --- | --- | --- |
| | | | | Ambient 26% R.H. | High 74% R.H. |
| 3-1 | A | 29.2 | 7 | 335 | 240 |
| 3-2 | A | 29.2 | — | 340 | 265 |
| 3-3 | A | 29.2 | 7 | 395 | 260 |
| 3-4 | A | 29.2 | — | 400 | 225 |
| 3-5 | B | 30.0 | 13 | 260 | 215 |
| 3-6 | B | 30.0 | — | 240 | 180 |
| 3-7 | B | 30.0 | 13 | 275 | 215 |
| 3-8 | B | 30.0 | — | 250 | 180 |
| 3-9 | C | 30.0 | 13 | 255 | 205 |
| 3-10 | C | 30.0 | — | 310 | 195 |
| 3-11 | C | 30.0 | 13 | 270 | 205 |
| 3-12 | C | 30.0 | 11 | 265 | 200 |

A Furfuryl alcohol, resorcinol, silane (in accordance with invention).
B Furfuryl alcohol plus silane (not in accordance with invention).
C Furfural alcohol plus phenol, plus silane (not in accordance with invention).

Tests 3-1 through 3-4, utilized 95 percent furfuryl alcohol, 5 percent resorcinol and 0.15 percent silane based on the binder. Examples 3-5 through 3-9 utilized 100 percent furfuryl alcohol and 0.15 percent silane. Examples 3-9 through 3-12 utilized 95 percent furfuryl alcohol, 5 percent phenol, and 0.15 percent silane. The results of these tests are tabulated in Table II. These results show that the binder containing furfuryl alcohol and resorcinol has approximately half the life than most, and twice the curing rate as those binders that contain either 100 percent furfuryl alcohol or furfuryl alcohol and phenol. The tests numbered 3—1 through 3–4 are the only tests that were run in accordance with the present invention. The test results with respect to the tensile strength show that the binder containing resorcinol, in accordance with the present invention, are clearly vastly superior to those binders that contain only furfuryl alcohol or the combination of furfuryl alcohol and phenol.

EXAMPLE 4

The purpose of this Example is to illustrate the comparison of the use of the binders in accordance with the present invention with a highly regarded commercially available binder.

In each of the tests of Example 4, summarized in Table III below, the binder is used at the level of 1 percent based on the weight of the sand mix, the catalyst specified in the Table is either benzenesulfonic acid (BSA) or toluenesulfonic acid (TSA), the life is determined as set forth in Example 2, the tensile strength data is determined as set forth in Example 2 after overnight storage at ambient relative humidity conditions. The minimum strip time set forth in Table III represents the time at which, in the opinion of the experienced operator, the test samples could be safely removed from the shaping element. These test are performed by packing a sample of the resin mix in a paper cup, and repeatedly testing the removal of the mass from the cup.

Tests 4–1, 4–3 and 4–5 utilize a highly regarded commercially available furfuryl alcohol-derived resin known as "Chemset 505" (T. M. Thiem Corporation). In tests 4–2, 4—4 and 4–6 the resin in accordance with the present invention utilizing 95 percent furfuryl alcohol and 5 percent resorcinol and 0.15 percent silane gamma-aminopropyltriethoxysilane, A-1100 (T. M. Union Carbide) was employed.

It is manifest that tests 4–1 and 4–2 were developed for the purposes of comparing the life, overnight tensile, and minimum strip time when 15 percent catalyst (benzenesulfonic acid) was employed in test procedure using Chemset 505 as a base for comparison with the otherwise identical procedure of the present invention (4–2). It is noted that the life of the binder in accordance with the present invention is approximately one-third that of the Chemset 505 and that in spite of the high cure rate the overnight tensile is substantially identical. Moreover, the strip time of using the binder in accordance with the present invention is approximately one-third that obtained using the highly regarded commercially available binder.

In comparing runs 4–3 with 4—4 it is noted that at a 30 percent catalyst (toluenesulfonic acid) level, binders in accordance with the present invention have approximately one-half the life as well as one-half of the strip time of that encountered with Chemset 505 under otherwise identical test circumstances. Nonetheless, in spite of the high cure rate and the rapid strip time which is achieved in accordance with the present invention, the tensile strengths are substantially identical to those obtained when the highly regarded commercially available Chemset 505 is employed.

As a result of comparing runs 4–5 with 4–6, it is apparent that when a 10 percent level of toluenesulfonic acid is used, the process of the present invention provided a life which is approximately one-fourth of that encountered when Chemset 505 is used, and the minimum strip time in accordance with the present invention is 220 minutes versus more than 7 hours when Chemset 505 is used. Nonetheless, in the latter comparison, in spite of the relatively rapid strip time, the tensile strength after overnight cure achieved in accordance with the present invention was vastly superior to that achieved with Chemset 505 under identical test circumstances.

TABLE III

| Test | Binder | Catalyst | % Catalyst | Life (Mins.) | (psi) Tensile Strength Overnight | Strip (Mins.) |
|---|---|---|---|---|---|---|
| 4-1 | Chem. 505 | BSA | 15 | 46 | 355 | 104 |
| 4-2 | 95/5* | BSA | 15 | 15 | 350 | 33 |
| 4-3 | Chem. 505 | TSA | 30 | 26 | 400 | 56 |
| 4-4 | 95/5 | TSA | 30 | 13 | 400 | 27 |
| 4-5 | Chem. 505 | TSA | 10 | 210 | 195 | >7 hrs. |
| 4-6 | 95/5 | TSA | 10 | 51 | 255 | 220 |

*95/5 refers to 95 percent FA, 5% resorcinol, and 0.15 percent silane in accordance with the present invention.

EXAMPLE 5

A quantity of the binder in accordance with the present invention which was produced in Example 2, using the silane additive, was divided into four test samples and the respective test samples were subjected to long term storage at minus 10° C., 0° C., 25° C., and 55° C. After three months the test is still in progress, however, the samples which have been stored for three months at −10° C. never indicated any evidence of freezing and showed no development whatsoever of a second phase.

Likewise, the 0° C. sample evidenced no freezing tendency, and showed no development whatsoever of a second phase.

The room temperature storage test showed no apparent change in viscosity, and no development of a second phase. The 55° C. storage test (the "advanced aging" test) showed no evidence of increase in the viscosity and no development of a second phase.

EXAMPLE 6

The purpose of this Example is to provide a comparison of the results which are obtained as a consequence of using respective binders in accordance with the present invention and binders comprised of a mixture of furfuryl alcohol and various monohydric and di-hydric phenols.

The procedure of Example 2, using silane, is repeated using the binder as set forth in Table IV. In each of the respective tests identified in Table IV only test 6–1 is in accordance with the present invention for the purpose of establishing a basis of comparison.

Each average tensile strength set forth in Table IV represents the average of 24 tests (six on each of four days), bench life and percent relative humidity are average for the four days. The results of the tests are summarized in Table IV.

It is noted that test 6–1 wherein the binder has included therein resorcinol in accordance with the present invention, the tensile strengths are vastly superior to the strengths which are achieved when any other phenols are employed instead. For example comparison of 6–1 with test 6—6 shows that more than 100 psi greater tensile strength is achieved at both low and high relative humidity using resorcinol than when phenol is used.

TABLE IV

| Test No. | Phenolic Compound | Tensile Strength, psi | | | | Bench Life (Mins.) |
|---|---|---|---|---|---|---|
| | | 32% R.H. | | 80% R.H. | | |
| | | Average | Range | Average | Range | |
| 6-1 | Resorcinol | 465 | 310–600 | 399 | 145–575 | 14 |

TABLE IV-continued

| Test No. | Phenolic Compound | Tensile Strength, psi | | | | Bench Life (Mins.) |
|---|---|---|---|---|---|---|
| | | 32% R.H. | | 80% R.H. | | |
| | | Average | Range | Average | Range | |
| 6-2 | 3,5-xylenol | 375 | 200–525 | 346 | 150–477 | 23 |
| 6-3 | M-cresol | 374 | 200–495 | 317 | 225–450 | 22 |
| 6-4 | p-cresol | 376 | 290–475 | 325 | 235–400 | 12 |
| 6-5 | catechol | 345 | 260–425 | 295 | 210–400 | 14 |
| 6-6 | phenol | 347 | 220–450 | 283 | 200–395 | 16 |
| 6-7 | hydroquinone | 326 | 220–520 | 307 | 235–435 | 12 |
| 6-8 | octylphenol | 357 | 230–450 | 306 | 210–425 | 24 |
| 6-9 | 4,4-dihydroxydiphenyl-sulfone | 347 | 230–445 | 318 | 215–435 | 14 |
| 6-10 | bisphenol A | 382 | 325–460 | 301 | 190–390 | 16 |

GENERAL DISCUSSION

In accordance with the present invention a highly efficacious foundry binder is produced by merely admixing furfuryl alcohol monomer (a liquid) with resorcinol (a solid at ambient room temperature), with the resulting binder being a highly fluid liquid solution which achieves very high tensile strength, very rapid cure times and strip times.

In addition, the expensive and time consuming pre-processing of the furfuryl alcohol either by itself or in combination with urea, formaldehyde or both, or the condensation of furfuryl alcohol with phenol-formaldehyde condensation product has been eliminated in the preparation of a foundry binder, without any loss of tensile strength and with an improvement in strip time as compared to the performance results with a highly regarded commercially available furane binder.

Moreover, in accordance with the present invention, the adverse environmental impact of formaldehyde during the manufacture of the resin, during the preparation of the sand mix, and finally during the pouring of the metal to the hardened sand shape has been eliminated. Moreover, the presence of nitrogen which is believed to be generated whenever binders containing urea are employed, has been eliminated thus making the sand shape produced in accordance with the present invention suitable for various steel castings as well as for iron castings, the pin hole problem thus being alleviated.

Moreover, it will be appreciated from a consideration of the foregoing disclosure that the binder in accordance with the present invention contains no water and it has been observed that the through cures which are achieved when using the binder of the present invention, are complete and rapid, the adverse effect of water in the heretofore available binders being absent.

It will be apparent from consideration of Example 2 hereinbefore that the utilization of a reactive silane, preferably, either vinyl- or amino- silane, is highly advantageous in the practice of the present invention. Generally speaking, we prefer the use of substituted silane compounds in which the molecular weight of the silane moiety is less than about 500. Nonetheless any of the commercially available silanes which are known, in the art, to be useful as glass or silica adhesion promoters can be used, to advantage, in accordance with the present invention. Generally speaking, the adhesion promoter silane is added in an amount from about 0.1 percent to 3 percent based on the weight of the resin. It is preferred that the silane be added to the resin and well distributed therein prior to the distribution of the binder on the sand.

For the purpose of illustrating various silanes which can be used to advantage in accordance with the present invention, and not for the purpose of limiting the use of silanes, the following specific examples are provided. For example any of the organosilicon compounds referred to in U.S. Pat. No. 3,737,430 to Brown et al. can be used. In addition, other specific examples include the following:

gamma-mercaptopropyltrimethoxysilane
N-beta-(aminoethyl)-gamma-aminopropyltrimethoxysilane
beta-(3,4-epoxycyclohexyl)ethyltrimethoxysilane
gamma-glycidoxypropyltrimethoxysilane
gamma-aminopropyltriphenoxysilane
gamma-aminopropyltribenzoyoxysilane
gamma-aminopropyltrifurfuroxysilane
gamma-aminopropyltri (o-chlorophenoxy)silane
gamma-aminopropyltri (p-chlorophenoxy)silane, and
gamma-aminopropyltri(tetrahydrofurfuroxy)silane
methyl[2-(gamma-triethoxysilypropyl-amino)ethyl amino]3-propionate in methanol
modified amino-organosilane
Ureido-silane
mercaptoethyltriethoxysilane
chloropropyltrimethoxysilane
vinyltrichlorosilane
vinyltriethoxysilane
vinyltrimethoxysilane
gamma-methacryloxypropyltrimethoxysilane
gamma-methacryloxypropyltri(2-methoxyethoxy)silane
gamma-glycidoxypropyltrimethoxysilane
vinyltriacetoxysilane
gamma-mercaptopropyltrimethoxysilane
gamma-aminopropyltriethoxysilane
N-beta(aminoethyl)-gamma-amino-propyltrimethoxysilane Generally speaking, it is preferred that the silane be used in an amount sufficient to provide about 0.15 percent based on the weight of the binder.

Also, it is contemplated that a concentrated solution of furfuryl alcohol and resorcinol be prepared for storage, with the concentrate being diluted 1:8, for example, with monomeric furfuryl alcohol, to give the preferred 5 percent resorcinol solution. It is preferred that the concentrate also contain a relatively high level of silane, so that, upon dilution preferred levels of silane are present in the resulting binder.

Therefor, we claim:

1. The method of manufacturing foundry sand shapes for use as cores and molds comprising placing a sand mix in the shaping element and hardening the mix in the shaping element, the sand mix comprising sand, an acid catalyst, and a monomeric mixture of furfuryl alcohol and resorcinol, comprising 2–45 percent resorcinol.

2. The method of claim 1 in which the monomeric mixture of furfuryl alcohol and resorcinol comprises 4–10 percent resorcinol.

3. The method of claim 1 in which the acid catalyst is a member selected from the group aromatic sulfonic acid.

4. The method of claim 1 in which the mixture of furfuryl alcohol and resorcinol also includes a silane.

5. The method of manufacturing sand shapes for use as foundry cores and molds comprising admixing with sand an acid catalyst, and thereafter admixing with the sand-catalyst mixture a binder comprising furfuryl alcohol monomer and resorcinol including from 2 to 45 percent resorcinol, said binder being admixed in an amount of 0.5–3 percent by weight based on the weight of the resulting mixture, said catalyst being used in an amount in the range of 5–100 percent by weight based on the weight of the binder.

6. The method of claim 5 in which the binder includes from 4 to 10 percent resorcinol.

7. The method of claim 5 in which the acid catalyst is a member selected from the group aromatic sulfonic acid.

8. The method of claim 5 in which the binder also includes a silane.

9. A foundry binder comprising a monomeric liquid mixture comprising furfuryl alcohol and resorcinol, the resorcinol being present in an amount from 2 to 45 percent by weight based on the weight of the mixture.

10. A foundry binder comprising a monomeric mixture of furfuryl alcohol, resorcinol, and a silane, the resorcinol being present in an amount from 2 to 45 percent based on the weight of the mixture, the silane being present in an amount from about 0.1 to 3 percent by weight.

* * * * *